(12) United States Patent
D'Hooge et al.

(10) Patent No.: US 10,625,951 B2
(45) Date of Patent: Apr. 21, 2020

(54) CONVEYANCE SYSTEM FOR OPERATION IN RADIOACTIVE ENVIRONMENT

(71) Applicant: Mallinckrodt Nuclear Medicine LLC, Maryland Heights, MO (US)

(72) Inventors: Michael J. D'Hooge, Bridgeton, MO (US); Sumit Verma, Chestefield, MO (US); Kevin B. Graves, Catawissa, MO (US); Bryan S. Petrofsky, St. Louis, MO (US)

(73) Assignee: Curium US LLC, St. Louis, MO (US)

( * ) Notice: Subject to any disclaimer, the term of this patent is extended or adjusted under 35 U.S.C. 154(b) by 0 days.

(21) Appl. No.: 16/138,572

(22) Filed: Sep. 21, 2018

(65) Prior Publication Data

US 2019/0023494 A1 Jan. 24, 2019

Related U.S. Application Data

(63) Continuation of application No. 15/410,389, filed on Jan. 19, 2017, now Pat. No. 10,099,863.

(Continued)

(51) Int. Cl.
*B65G 15/58* (2006.01)
*B65G 35/06* (2006.01)

(Continued)

(52) U.S. Cl.
CPC ............. *B65G 35/06* (2013.01); *B65B 43/52* (2013.01); *B65G 25/02* (2013.01); *B66F 3/247* (2013.01);

(Continued)

(58) Field of Classification Search
None
See application file for complete search history.

(56) References Cited

U.S. PATENT DOCUMENTS 3,666,086 A 5/1972 Brockmann
3,827,579 A * 8/1974 Kendall ................. G21C 19/36
29/723

(Continued)

FOREIGN PATENT DOCUMENTS

EP 2420450 A1 2/2012
WO 2005093433 A1 10/2005

OTHER PUBLICATIONS

International Search Report and Written Opinion of the International Searching Authority regarding PCT/US2017014148 dated Apr. 19, 2017; pp. 1-16.

*Primary Examiner* — Kavel Singh
(74) *Attorney, Agent, or Firm* — Armstrong Teasdale LLP

(57) ABSTRACT

A system for manufacturing radionuclide generators includes an enclosure defining a radioactive environment. The enclosure includes radiation shielding to prevent radiation within the radioactive environment from moving to an exterior of the enclosure. The system also includes a conveyance system having a forward track and first carriages positioned on and movable along the forward track for conveying racks in a first direction. The conveyance system also includes a first walking beam mechanism magnetically coupled to the first carriages to move the first carriages. The conveyance system further includes a return track and second carriages positioned on and movable along the return track for conveying racks in a second direction opposite the first direction. The forward track and the return track form a loop.

13 Claims, 15 Drawing Sheets

Related U.S. Application Data

(60) Provisional application No. 62/331,608, filed on May 4, 2016.

(51) Int. Cl.
*B65G 35/00* (2006.01)
*B65G 15/00* (2006.01)
*G21G 1/00* (2006.01)
*B65G 25/02* (2006.01)
*B66F 3/24* (2006.01)
*G21F 7/06* (2006.01)
*G21G 4/04* (2006.01)
*B65B 43/52* (2006.01)

(52) U.S. Cl.
CPC .............. *G21F 7/06* (2013.01); *G21G 1/0005* (2013.01); *G21G 4/04* (2013.01); *G21G 2001/0036* (2013.01)

(56) References Cited

U.S. PATENT DOCUMENTS

| | | | |
|---|---|---|---|
| 4,102,173 A | 7/1978 | Saloom | |
| 4,682,927 A | 7/1987 | Southworth et al. | |
| 4,735,305 A * | 4/1988 | Lutz | B65G 25/02 198/774.2 |
| 5,676,518 A | 10/1997 | Okubo et al. | |
| 5,720,377 A * | 2/1998 | Lapeus | B01L 9/06 198/346.1 |
| 5,881,649 A | 3/1999 | Hasegawa et al. | |
| 5,918,727 A | 7/1999 | Wallace et al. | |
| 5,928,711 A | 7/1999 | Wallace et al. | |
| 6,112,389 A | 9/2000 | Boltshauser | |
| 6,152,671 A | 11/2000 | Kaishita et al. | |
| 6,311,832 B1 | 11/2001 | Kwasniewicz et al. | |
| 6,318,542 B1 | 11/2001 | Ikeda et al. | |
| 6,332,529 B1 | 12/2001 | Kaishita et al. | |
| 6,354,431 B1 | 3/2002 | Dececca et al. | |
| 6,374,986 B1 | 4/2002 | Oe | |
| 6,457,577 B1 | 10/2002 | Ikeda et al. | |
| 6,588,580 B2 | 7/2003 | Janzen | |
| 6,622,850 B2 * | 9/2003 | Noda | B65G 25/02 198/621.1 |
| 6,699,329 B2 | 3/2004 | Mueller et al. | |
| 6,907,106 B1 | 6/2005 | McIntyre et al. | |
| 7,028,831 B2 | 4/2006 | Veiner | |
| 7,387,070 B1 | 6/2008 | Mydlack et al. | |
| 7,715,166 B2 | 5/2010 | Schultz et al. | |
| RE41,760 E | 9/2010 | Thompson | |
| 7,850,914 B2 | 12/2010 | Veiner et al. | |
| 7,909,158 B2 * | 3/2011 | Noe | B65G 25/02 198/463.3 |
| 7,998,409 B2 | 8/2011 | Veiner et al. | |
| 8,181,767 B2 | 5/2012 | Gales et al. | |
| 9,132,873 B1 | 9/2015 | Laurence et al. | |
| 9,132,966 B1 | 9/2015 | Groenewald et al. | |
| 9,187,268 B2 | 11/2015 | Denninger et al. | |
| 9,239,335 B2 | 1/2016 | Heise et al. | |
| 2009/0205933 A1 * | 8/2009 | Sugahara | F16H 19/0622 198/618 |
| 2011/0305309 A1 | 12/2011 | Brown | |
| 2012/0295358 A1 | 11/2012 | Ariff et al. | |

\* cited by examiner

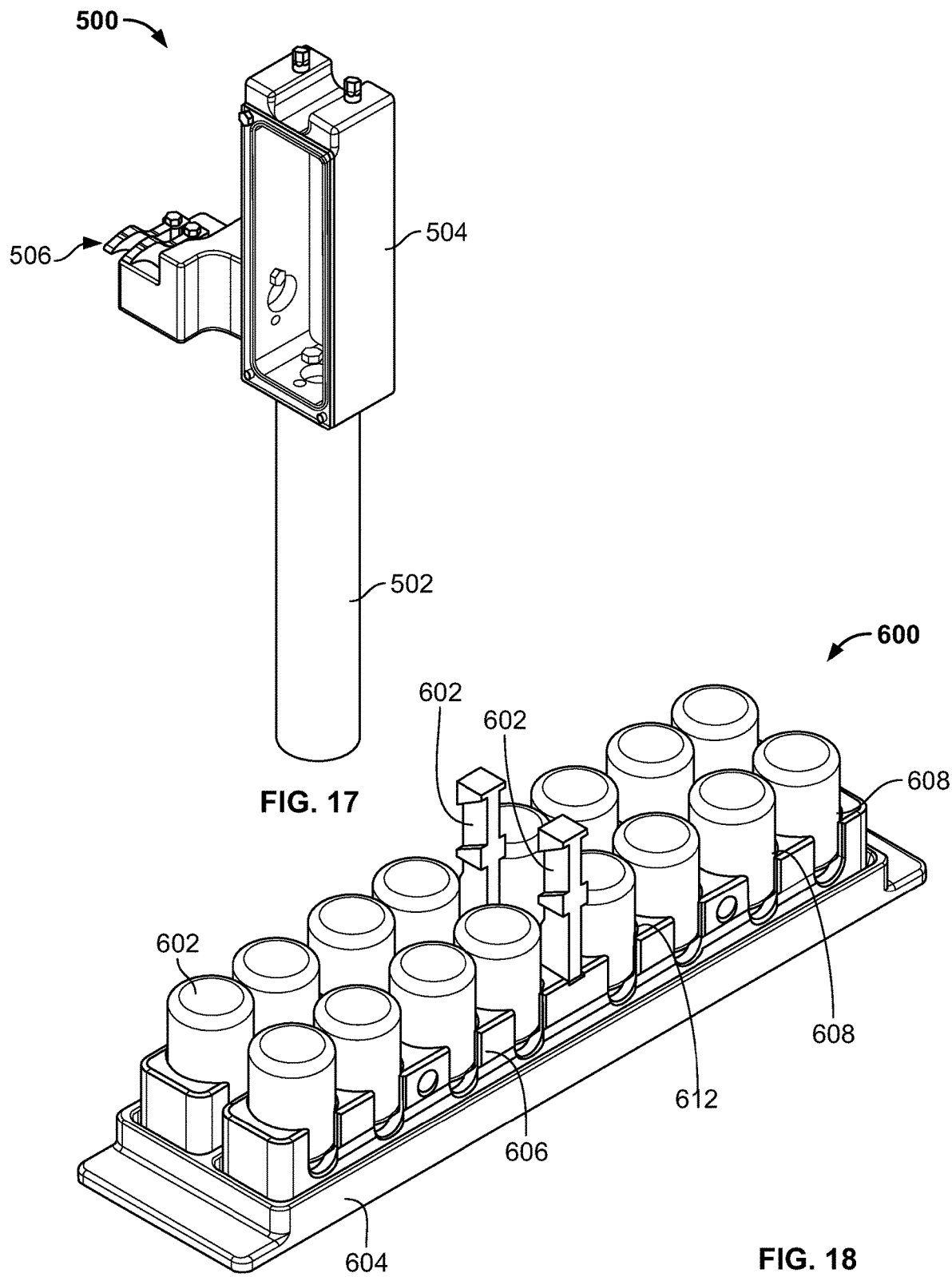

CONVEYANCE SYSTEM FOR OPERATION IN RADIOACTIVE ENVIRONMENT

CROSS-REFERENCE TO RELATED APPLICATIONS

This application is a continuation of and claims priority to U.S. patent application Ser. No. 15/410,389, filed Jan. 19, 2017, which claims priority to U.S. Provisional Patent Application Ser. No. 62/331,608, filed May 4, 2016, the disclosures of which are hereby incorporated by reference in their entirety.

FIELD

The field of the disclosure relates generally to conveyance systems and, more particularly, to a conveyance system for operation in a radioactive environment.

BACKGROUND

Radioactive material is used in nuclear medicine for diagnostic and therapeutic purposes by injecting a patient with a small dose of the radioactive material, which concentrates in certain organs or regions of the patient. Radioactive materials typically used for nuclear medicine include Germanium-68 ("Ge-68"), Strontium-87m, Technetium-99m ("Tc-99m"), Indium-111m ("In-111"), Iodine-131 ("I-131") and Thallium-201. Such radioactive materials may be produced using a radionuclide generator. Radionuclide generators generally include a column that has media for retaining a long-lived parent radionuclide that spontaneously decays into a daughter radionuclide that has a relatively short half-life. The column may be incorporated into a column assembly that has a needle-like outlet port that receives an evacuated vial to draw saline or other eluant liquid, provided to a needle-like inlet port, through a flow path of the column assembly, including the column itself. This liquid may elute and deliver daughter radionuclide from the column and to the evacuated vial for subsequent use in nuclear medical imaging applications, among other uses.

During processing and handling of the radionuclide generators, components of the radionuclide generators may be transported through at least one station. Accordingly, a need exists for a conveyance system that efficiently transports components of radionuclide generators and is suitable for use within a radioactive environment.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF SUMMARY

In one aspect, a system for manufacturing radionuclide generators includes an enclosure defining a radioactive environment. The enclosure includes radiation shielding to prevent radiation within the radioactive environment from moving to an exterior of the enclosure. The system also includes a conveyance system within the enclosure. The conveyance system includes a forward track and first carriages positioned on and movable along the forward track for conveying racks in a first direction. The conveyance system also includes a first walking beam mechanism magnetically coupled to the first carriages to move the first carriages. The conveyance system further includes a return track and second carriages positioned on and movable along the return track for conveying racks in a second direction opposite the first direction. The forward track and the return track form a loop.

In another aspect, a method of conveying a rack in a radioactive environment includes positioning the rack on a first carriage that moves along a track positioned above a tabletop. The tabletop defines a clean workspace. The method also includes actuating a walking beam mechanism magnetically coupled to the first carriage to move the first carriage along the track in a first direction. The walking beam mechanism is sealed from the clean workspace. The method further includes positioning the rack on a second carriage magnetically coupled to the walking beam mechanism and actuating the walking beam mechanism to move the second carriage along the track in the first direction.

In yet another aspect, a conveyance system for operation in a radioactive environment includes a track positioned above a tabletop defining a clean workspace. The conveyance system also includes carriages positioned on and movable along the track and a walking beam mechanism located below the tabletop and sealed from the clean workspace. The walking beam mechanism is magnetically coupled to the carriages.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

FIG. 17 is an isometric view of a sensor of the conveyance system.

FIG. 18 is an isometric view of a rack for holding vials.

DETAILED DESCRIPTION

Figure 1:
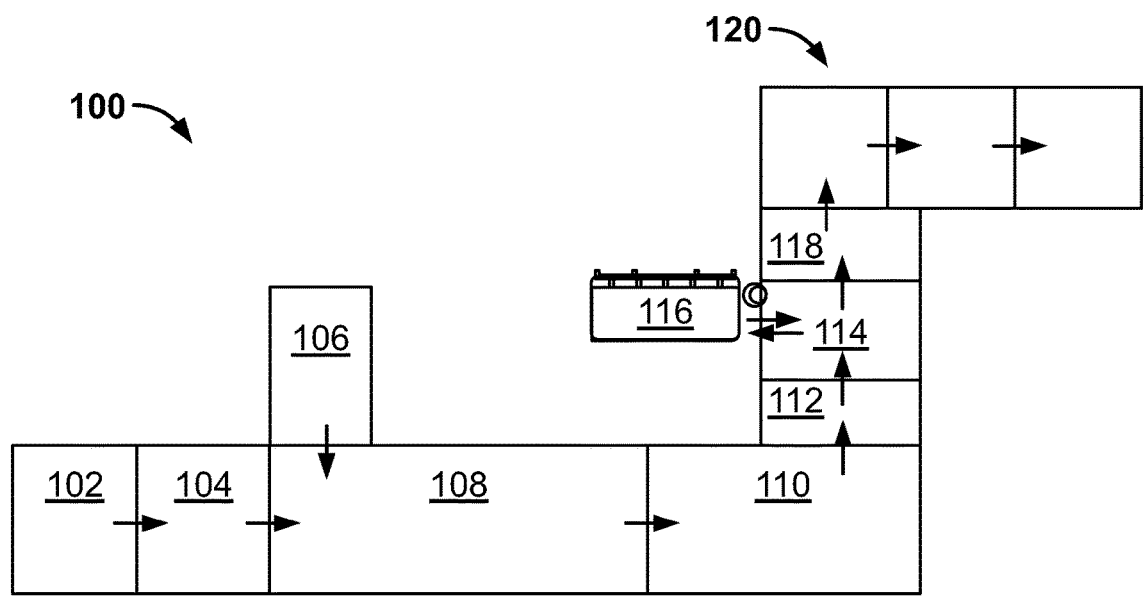
FIG. 1 is a schematic view of a system for producing radionuclide generators.

FIG. 1 is a schematic view of a system 100 for manufacturing radionuclide generators. The system 100 shown in FIG. 1 may be used to produce various radionuclide generators, including, for example and without limitation, Technetium generators, Indium generators, and Strontium generators. The system 100 of FIG. 1 is particularly suited for producing Technetium generators. A Technetium generator is a pharmaceutical drug and device used to create sterile injectable solutions containing Tc-99m, an agent used in diagnostic imaging with a relatively short 6 hour radiological half-life, allowing the Tc-99m to be relatively quickly eliminated from human tissue. Tc-99m is "generated" via the natural decay of Molybdenum ("Mo-99"), which has a 66 hour half-life, which is desirable because it gives the generator a relatively long two week shelf life. During generator operation (i.e., elution with a saline solution), Mo-99 remains chemically bound to a core alumina bed (i.e., a retaining media) packed within the generator column, while Tc-99m washes free into an elution vial, ready for injection into a patient. While the system 100 is described herein with reference to Technetium generators, it is understood that the system 100 may be used to produce radionuclide generators other than Technetium generators.

As shown in FIG. 1, the system 100 generally includes a plurality of stations. In the example embodiment, the system 100 includes a cask loading station 102, a formulation station 104, an activation station 106, a fill/wash station 108, an assay/autoclave loading station 110, an autoclave station 112, an autoclave unloading station 114, a quality control testing station 116, a shielding station 118, and a packaging station 120.

The cask loading station 102 is configured to receive and handle casks or containers of radioactive material, such as a parent radionuclide, and transfer the radioactive material to the formulation station 104. Radioactive material may be transported in secondary containment vessels and flasks that need to be removed from an outer cask prior to formulation. The cask loading station 102 includes suitable tooling and mechanisms to extract secondary containment vessels and flasks from outer casks, as well as transfer of flasks to the formulation cell. Suitable devices that may be used in the cask loading station include, for example and without limitation, telemanipulators.

At the formulation station 104, the raw radioactive material (i.e., Mo-99) is quality control tested, chemically treated if necessary, and then pH adjusted while diluting the raw radioactive material to a desired final target concentration. The formulated radioactive material is stored in a suitable containment vessel (e.g., within the formulation station 104).

Column assemblies containing a column of retaining media (e.g., alumina) are activated at the activation station 106 to facilitate binding of the formulated radioactive material with the retaining media. In some embodiments, column assemblies are activated by eluting the column assemblies with a suitable volume of hydrogen chloride (HCl) at a suitable pH level. Column assemblies are held for a minimum wait time prior to charging the column assemblies with the parent radionuclide.

Following activation, column assemblies are loaded into the fill/wash station 108 using a suitable transfer mechanism (e.g., transfer drawer). Each column assembly is then charged with parent radionuclide by eluting formulated radioactive solution (e.g., Mo-99) from the formulation station 104 through individual column assemblies using suitable liquid handling systems (e.g., pumps, valves, etc.). The volume of formulated radioactive solution eluted through each column assembly is based on the desired curie (Ci) activity for the corresponding column assembly. The volume eluted through each column assembly is equivalent to the total Ci activity identified at the time of calibration for the column assembly. For example, if a volume of formulated Mo-99 required to make a 1.0 Ci generator (at time of calibration) is 'X', the volume required to make a 19.0 Ci generator is simply 19 times X. After a minimum wait time, the charged column assemblies are eluted with a suitable volume and concentration of acetic acid, followed by an elution with a suitable volume and concentration of saline to "wash" the column assemblies. Column assemblies are held for a minimum wait time before performing assays on the column assemblies.

The charged and washed column assemblies (or radionuclide generators) are then transferred to the assay/autoclave load station 110, in which assays are taken from each column assembly to check the amount of parent and daughter radionuclide produced during elution. Each column assembly is eluted with a suitable volume of saline, and the resulting solution is assayed to check the parent and daughter radionuclide levels in the assay. Where the radioactive material is Mo-99, the elutions are assayed for both Tc-99m and Mo-99. Column assemblies having a daughter radionuclide (e.g., Tc-99m) assay falling outside an acceptable range calculation are rejected. Column assemblies having a parent radionuclide (e.g., Mo-99) breakthrough exceeding a maximum acceptable limit are also rejected.

Following the assay process, tip caps are applied to the outlet port and the fill port of the column assembly. Column assemblies may be provided with tip caps already applied to the inlet port. If the column assembly is not provided with a tip cap pre-applied to the inlet port, a tip cap may be applied prior to, subsequent to, or concurrently with tip caps being applied to the outlet port and the fill port. Assayed, tip-capped column assemblies are then loaded into an autoclave sterilizer located in the autoclave station 112 for terminal sterilization. The sealed column assemblies are subjected to an autoclave sterilization process within the autoclave station 112 to produce terminally-sterilized column assemblies.

Following the autoclave sterilization cycle, column assemblies are unloaded from the autoclave station 112 into the autoclave unloading station 114. Column assemblies are then transferred to the shielding station 118 for shielding.

Some of the column assemblies are transferred to the quality control testing station 116 for quality control. In the example embodiment, the quality control testing station 116 includes a QC testing isolator that is sanitized prior to QC testing, and maintained at a positive pressure and a Grade A clean room environment to minimize possible sources of contamination. Column assemblies are aseptically eluted for in-process QC sampling, and subjected to sterility testing within the isolator of the quality control testing station 116. Tip caps are applied to the inlet and outlet needles of the column assemblies before the column assemblies are transferred back to the autoclave unloading station 114.

The system 100 includes a suitable transfer mechanism for transferring column assemblies from the autoclave unloading station 114 (which is maintained at a negative pressure differential, Grade B clean room environment) to the isolator of the quality control testing station 116. In some embodiments, column assemblies subjected to quality control testing may be transferred from the quality control testing station 116 back to the autoclave unloading station 114, and can be re-sterilized and re-tested, or re-sterilized and packaged for shipment. In other embodiments, column assemblies are discarded after being subjected to QC testing.

In the shielding station 118, column assemblies from the autoclave unloading station 114 are visually inspected for container closure part presence, and then placed within a radiation shielding container (e.g., a lead plug). The radiation shielding container is inserted into an appropriate safe constructed of suitable radiation shielding material (e.g., lead, tungsten or depleted uranium). Shielded column assemblies are then released from the shielding station 118.

In the packaging station 120, shielded column assemblies from the shielding station 118 are placed in buckets pre-labeled with appropriate regulatory (e.g., FDA) labels. A label uniquely identifying each generator is also printed and applied to each bucket. A hood is then applied to each bucket. A handle is then applied to each hood.

The system 100 may generally include any suitable transport systems and devices to facilitate transferring column assemblies between stations. In some embodiments, for example, each of the stations includes at least one telemanipulator to allow an operator outside the hot cell environment (i.e., within the surrounding room or lab) to manipulate and transfer column assemblies within the hot cell environment. Moreover, in some embodiments, the system 100 includes a conveyance system to automatically transport column assemblies between the stations and/or between substations within one or more of the stations (e.g., between a fill substation and a wash substation within the fill/wash station 108).

In the example embodiment, some stations of the system 100 include and/or are enclosed within a shielded nuclear radiation containment chamber, also referred to herein as a "hot cell". Hot cells generally include an enclosure constructed of nuclear radiation shielding material designed to shield the surrounding environment from nuclear radiation. Suitable shielding materials from which hot cells may be constructed include, for example and without limitation, lead, depleted uranium, and tungsten. In some embodiments, hot cells are constructed of steel-clad lead walls forming a cuboid or rectangular prism. In some embodiments, a hot cell may include a viewing window constructed of a transparent shielding material. Suitable materials from which viewing windows may be constructed include, for example and without limitation, lead glass. In the example embodiment, each of the cask loading station 102, the formulation station 104, the fill/wash station 108, the assay/autoclave loading station 110, the autoclave station 112, the autoclave unloading station 114, and the shielding station 118 include and/or are enclosed within a hot cell.

In some embodiments, one or more of the stations are maintained at a certain clean room grade (e.g., Grade B or Grade C). In the example embodiment, pre-autoclave hot cells (i.e., the cask loading station 102, the formulation station 104, the fill/wash station 108, the assay/autoclave loading station 110) are maintained at a Grade C clean room environment, and the autoclave unloading cell or station 114 is maintained at a Grade B clean room environment. The shielding station 118 is maintained at a Grade C clean room environment. The packaging stations 120 are maintained at a Grade D clean room environment.

Additionally, the pressure within one or more stations of the system 100 may be controlled at a negative or positive pressure differential relative to the surrounding environment and/or relative to adjacent cells or stations. In some embodiments, for example, all hot cells are maintained at a negative pressure relative to the surrounding environment. Moreover, in some embodiments, the isolator of the quality control testing station 116 is maintained at a positive pressure relative to the surrounding environment and/or relative to adjacent stations of the system 100 (e.g., relative to the autoclave unloading station 114).

Figure 2:
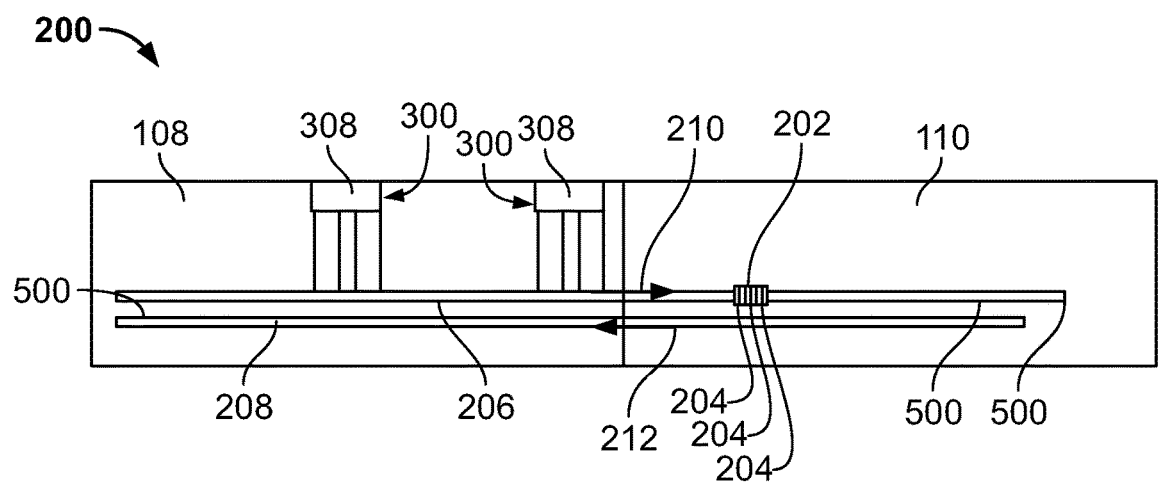
FIG. 2 is a plan view of a conveyance system of the system shown in FIG. 1.

FIG. 2 is a plan view of a conveyance system 200 of system 100. In particular, the conveyance system 200 conveys materials through at least the fill/wash station 108 and the assay/autoclave loading station 110 of system 100. In alternative embodiments, the conveyance system 200 may convey materials through any stations of system 100. Moreover, the conveyance system 200 may convey any materials, including radioactive and nonradioactive materials. In this embodiment, the conveyance system 200 conveys racks 202 that may hold column assemblies 204 loaded with radioactive materials. Moreover, the conveyance system 200 is resistant to the effects of radiation. In some embodiments, the conveyance system 200 may convey vial racks 600 (shown in FIG. 18) that may hold vials 602 (shown in FIG. 18).

As shown in FIG. 2, the conveyance system 200 includes a forward track 206 and a return track 208. The racks 202 may be conveyed on the forward track 206 in a forward direction 210 and on the return track 208 in a return direction 212. For example, during operation of system 100, the column assemblies 204 may be transferred in racks 202 on the forward track 206 to the fill/wash station 108 and the assay/autoclave loading station 110. Empty racks 202 may be conveyed on the return track 208 to an end of the return track 208 where the rack may be positioned on the forward track 206 and loaded with column assemblies 204. Accordingly, the forward track 206 and the return track 208 form a continuous loop. In alternative embodiments, the conveyance system 200 may have any configuration that enables system 100 to operate as described. For example, in some embodiments, the return track 208 is omitted.

Figure 3:
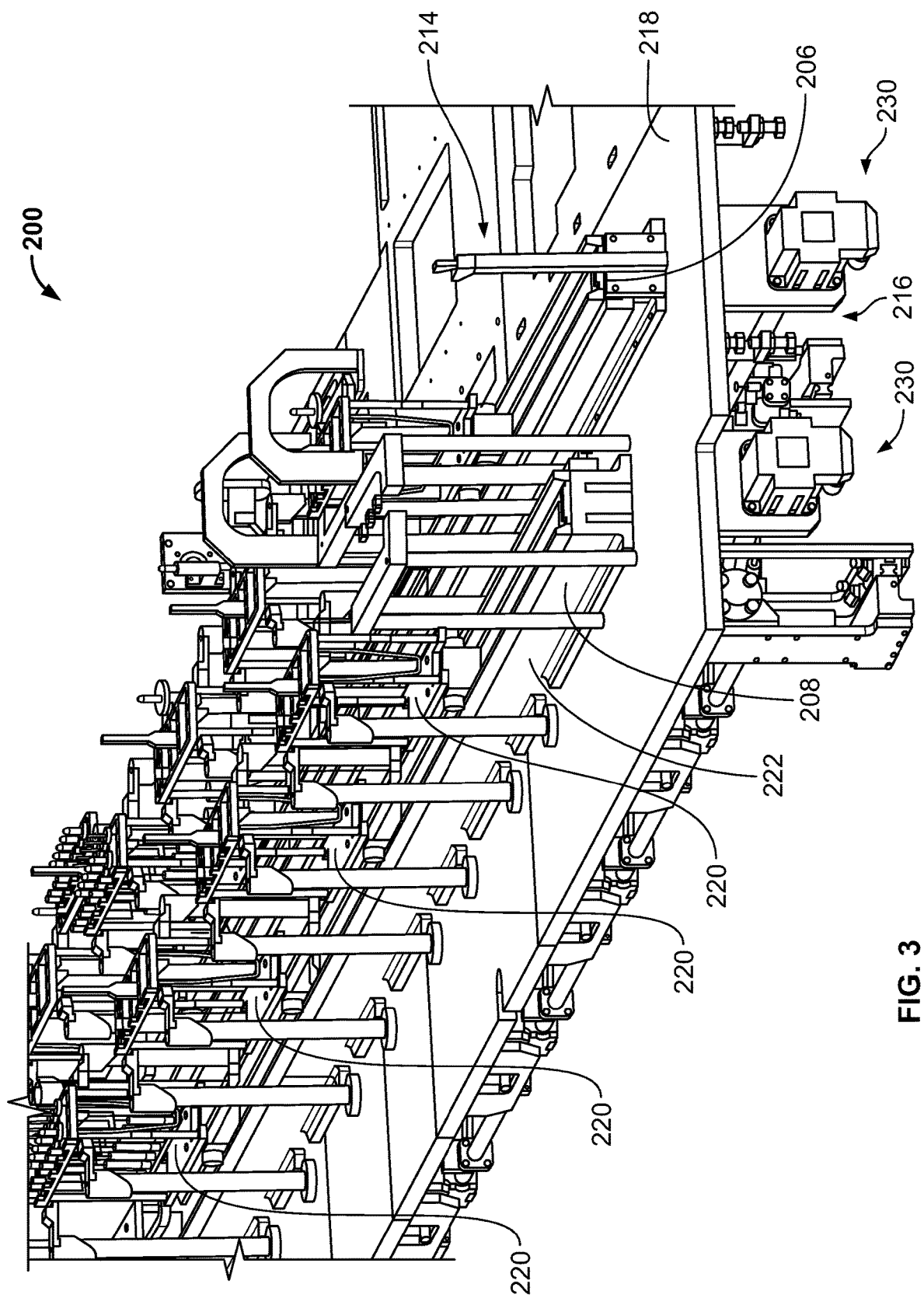
FIG. 3 is an isometric view of the conveyance system.
Figure 4:
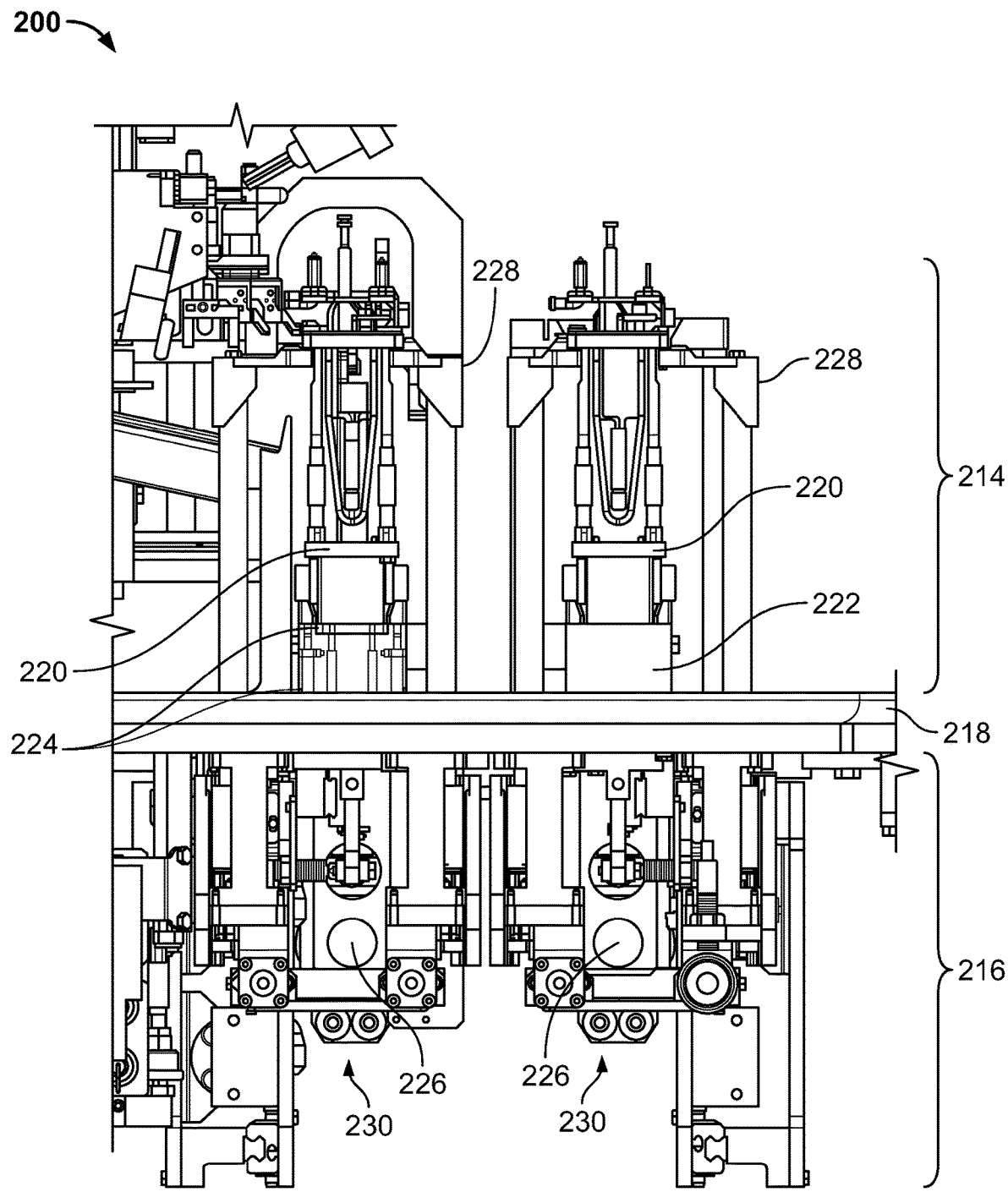
FIG. 4 is a side view of the conveyance system.

Referring to FIGS. 3 and 4, the conveyance system 200 includes an upper portion 214 and a lower portion 216. The upper portion 214 is located above a tabletop 218 and includes tracks 206, 208 and carriages 220. Notably, the lower portion 216 includes substantially all of the electronic and mechanical drive components of the conveyance system 200, such as servomotors, shafts, lead screws, and lift mechanisms. The lower portion 216 is separated from the upper portion 214, and other portions of a hot cell, by a base 222 and the tabletop 218. The base 222 and tabletop 218 are hermitically sealed to isolate the lower portion 216. As a result, the tabletop 218 defines a clean workspace and contamination due to the electronic and drive components of the lower portion 216 is contained on the exterior of the work space. Moreover, the area above the tabletop 218 can be sanitized with chemicals such as vaporized hydrogen peroxide that would otherwise damage the lower portion 216 of the conveyance system.

To allow maintenance of the lower portion 216, an access space is provided below at least some components of the lower portion. For example, at least 22 inches is provided below the walking beam mechanism. In addition, all components of the lower portion are removable in sections that weigh less than a predetermined amount. For example, the sections may weigh less than 30 lbs.

The base 222 and tabletop 218 may be made from any materials that enable the system 100 to operate as described. In this embodiment, the base 222 and tabletop 218 are made from stainless steel. In addition, the base 222 and tabletop 218 are sealed by O-rings 224 (or gaskets) to hermetically separate the lower portion 216 from the clean work space. In some embodiments, each O-ring 224 may include an elastomer strip that fits into a mechanical groove. For example, the O-rings 224 may extend along an edge of the base 222 and be secured between the base 222 and tabletop 218 when the base 222 is fastened to the tabletop 218. In addition, the O-rings 224 may extend between the carriages 220 and base 222 and form a gas-tight seal. During assembly, the O-rings 224 may be compressed to provide a gas-tight seal. In alternative embodiments, the system 100 may include any seals that enable the system 100 to operate as described.

All components of the conveyance system 200 are radiation insensitive to allow the conveyance system 200 to be located entirely in a radioactive environment without deterioration due to radiation. For example, servomotors 226 of the conveyance system include resolver-based feedback and insulated electrical cabling. Electrical cabling may be insulated using materials, such as polyurethane, that are suitable to withstand high levels of radiation. In addition, lift mechanisms 228 of the walking beam conveyance system utilize pneumatics which are insensitive to radiation.

In some embodiments, the conveyance system 200 may be sectioned. For example, the conveyance system 200 may include sections corresponding to different stations and substations of the system 100. In this embodiment, the conveyance system 200 includes at least three sections. Specifically, the forward track 206 of the conveyance system 200 includes three sections and the return track 208 includes two sections. In alternative embodiments, the conveyance system 200 may include any number of sections that enable the conveyance system to operate as described herein.

Figure 5:
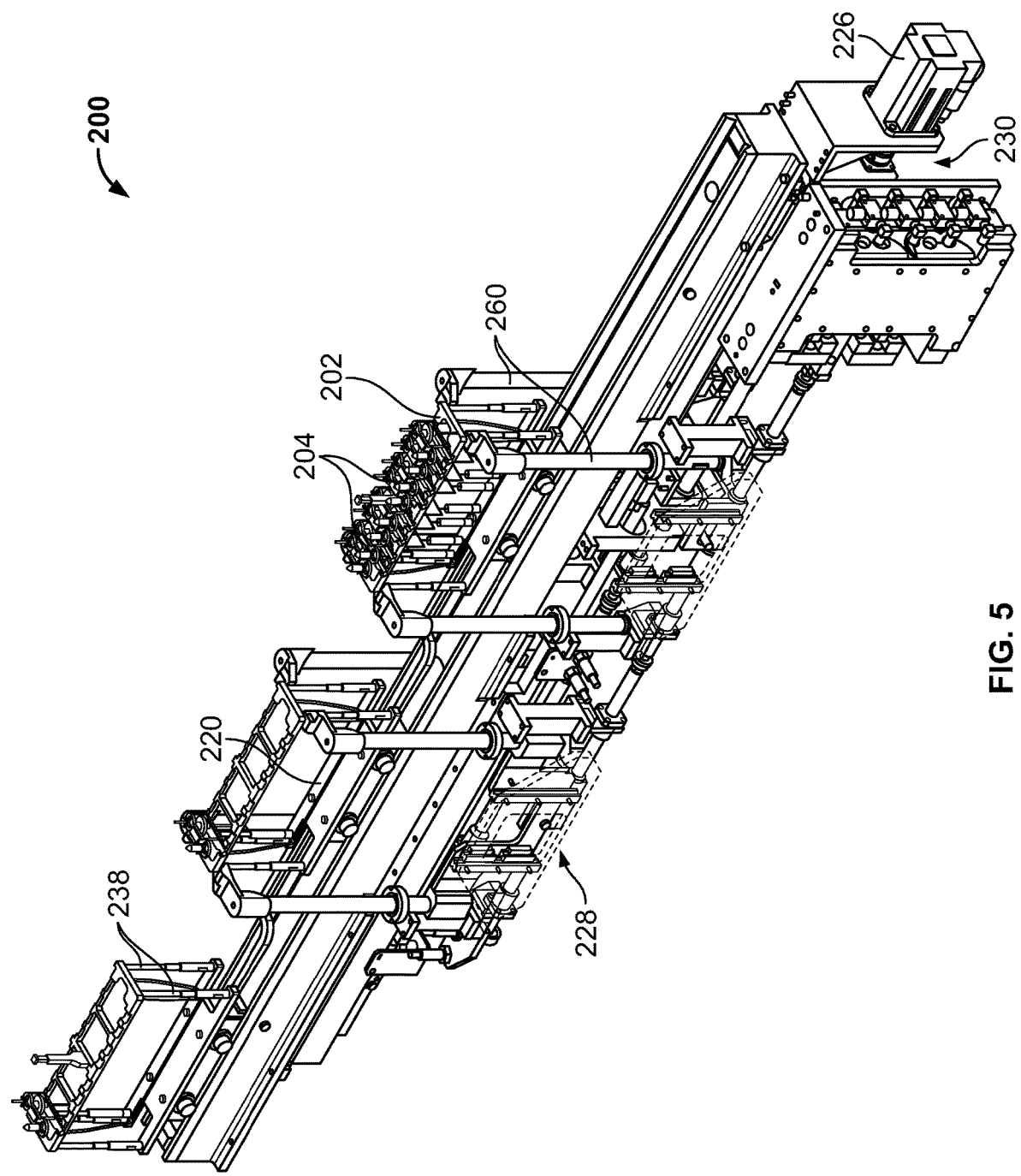
FIG. 5 is an isometric view of a section of the conveyance system.

In reference to FIGS. 5-10, conveyance system 200 includes carriages or carts 220, forward track 206, return track 208 (shown in FIG. 2), a walking beam mechanism 230, a servomotor 226, and a lift mechanism 228. The carriages 220 move along the forward track 206 and the return track 208 to convey materials. Three carriages 220 are shown in FIG. 5. In alternative embodiments, the conveyance system 200 may include any number of carriages that enable the conveyance system to function as described. Moreover, each section may include any number of carriages 220. For example, in some embodiments, each section includes three to six carriages 220 that are connected together and move in unison.

Figure 6:
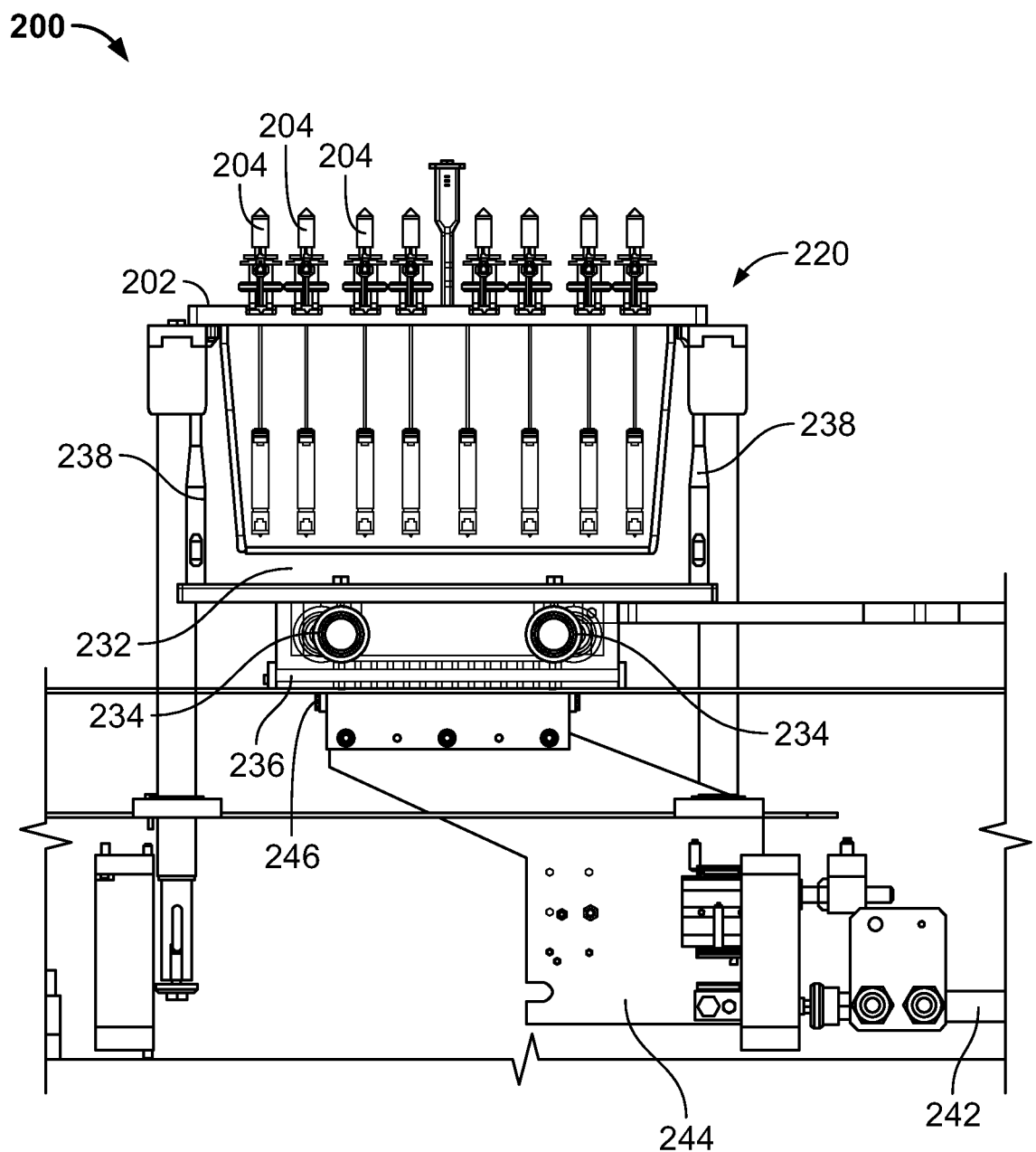
FIGS. 6-9 are side views of portions of the conveyance system.

In reference to FIG. 6, each carriage 220 includes a base 232, rollers 234, a carriage magnet 236, and carriage posts 238. In this embodiment, the carriage magnet 236 is a laminated magnet connected to the carriage base 232. In some embodiments, the carriage 220 may include an alignment tool to realign the carriage magnet 236 if the carriage 220 becomes misaligned with the walking beam mechanism 230. As will be described below, the carriages 220 are moved by the walking beam mechanism 230. At least some of the carriages 220 are connected such that the carriages 220 move in unison. Accordingly, the walking beam mechanism 230 can move the connected carriages 220 by directly engaging only one of the connected carriages. In alternative embodiments, the carriages 220 may move separately. In further embodiments, the carriages 220 may be propelled in any manner that enables the conveyance system 200 to operate as described. For example, in some embodiments, some of the carriages 220 may be manually moved along at least a portion of the conveyance system 200.

The carriage 220 engages with the walking beam mechanism 200 through the base 222. In particular, the carriage magnet 236 generates a magnetic field that attracts a portion of the walking beam mechanism 230. Due to the magnetic coupling, portions of the walking beam mechanism 230 do not have to extend into the clean workspace to couple to the carriages 220. Rather, the carriages 220 and the walking beam mechanism 230 magnetically engage through the base 222. The base 222 may be made from a material that magnetic fields pass through. In this embodiment, the base 222 is made from stainless steel. In alternative embodiments, the carriage 220 and walking beam mechanism 230 may engage in any manner that enables the conveyance system 200 to operate as described. For example, in some embodiments, the carriage 220 may include a ferromagnetic material that is attracted to a magnet of the walking beam mechanism 230.

In this embodiment, the rollers 234 are connected to the base 232 and move along the track 206 to guide the carriage 220. The carriage posts 238 extend upward from the base 232 and support the racks 202. The carriage posts 238 minimize the weight of the carriage 220 and reduce air disturbance as the carriage moves. In this embodiment, each carriage 220 includes four carriage posts 238. In alternative embodiments, the carriages 220 may include any posts that enable the carriages to function as described.

Figure 7:
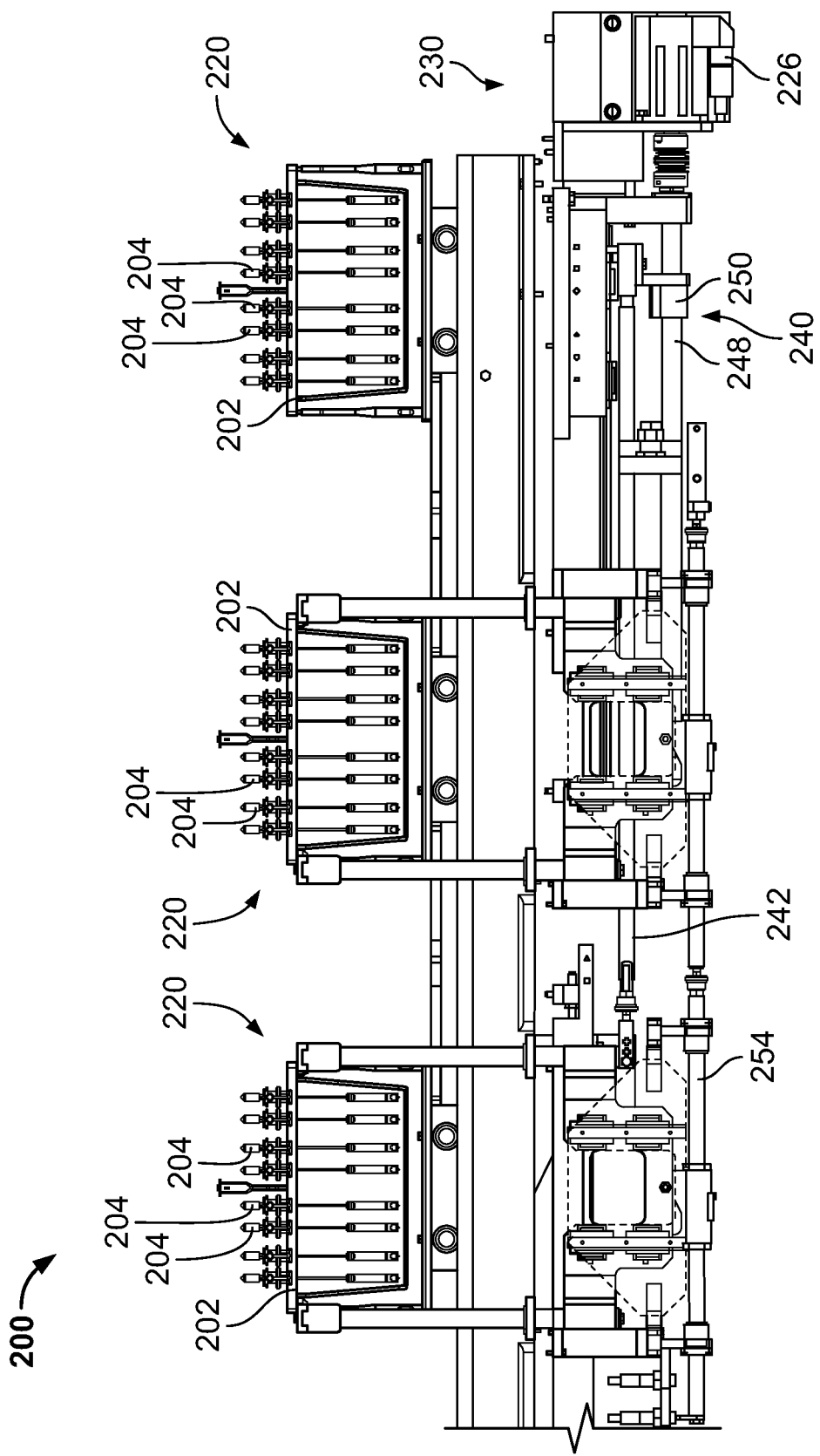

In reference to FIGS. 6 and 7, the walking beam mechanism 230 includes a drive mechanism 240, a shaft 242, a bracket 244, and a magnet 246. The drive mechanism 240 is connected to the servomotor 226 and the shaft 242. The magnet 246 is coupled to the shaft 242 by the bracket 244 and moves with the shaft. In this embodiment, the magnet 246 is a laminated magnet. The magnet 246 engages with the carriage magnet 236 through the base. Accordingly, the magnet 246 and the carriage magnet 236 ensure exact alignment of the walking beam mechanism 230 and the carriage 220.

In this embodiment, the drive mechanism 240 is a linear screw drive that includes a threaded shaft 248 and a traveling nut 250. The servomotor 226 causes the threaded shaft 248 to rotate. As the threaded shaft 248 rotates, the traveling nut 250 moves linearly along the threads. The traveling nut 250 is connected to the threaded shaft and causes the threaded shaft, bracket 244, and magnet 246 to move linearly. The servomotor 226 rotates the threaded shaft 248 alternately in two different directions, which causes the traveling nut 250, threaded shaft, bracket 244, magnet 246, and, thus, the carriages 220 to reciprocate linearly. In alternative embodiments, the walking beam mechanism 230 may have any configuration that enables the conveyance system 200 to operate as described.

The conveyance system 200 may include any number of walking beam mechanisms 230. In this embodiment, the conveyance system 200 includes one walking beam mechanism 230 for each section of the conveyance system. Each walking beam mechanism 230 magnetically engages a single carriage 220 that is connected to other carriages. The walking beam mechanism 230 moves the carriages 220 along the respective section of the conveyance system 200. The walking beam mechanisms 230 of the different sections are separated by shrouding.

Figure 8:
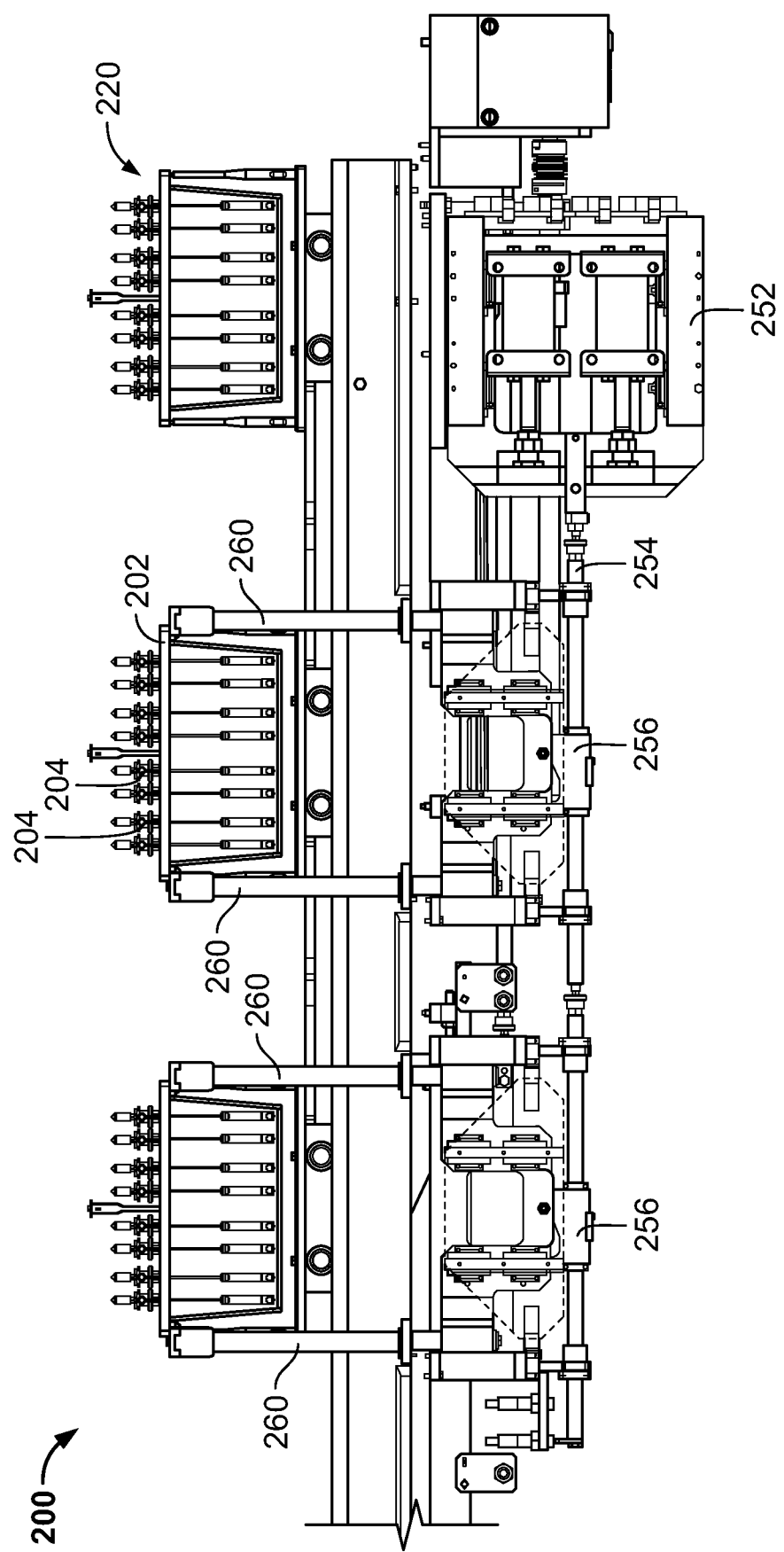
Figure 9:
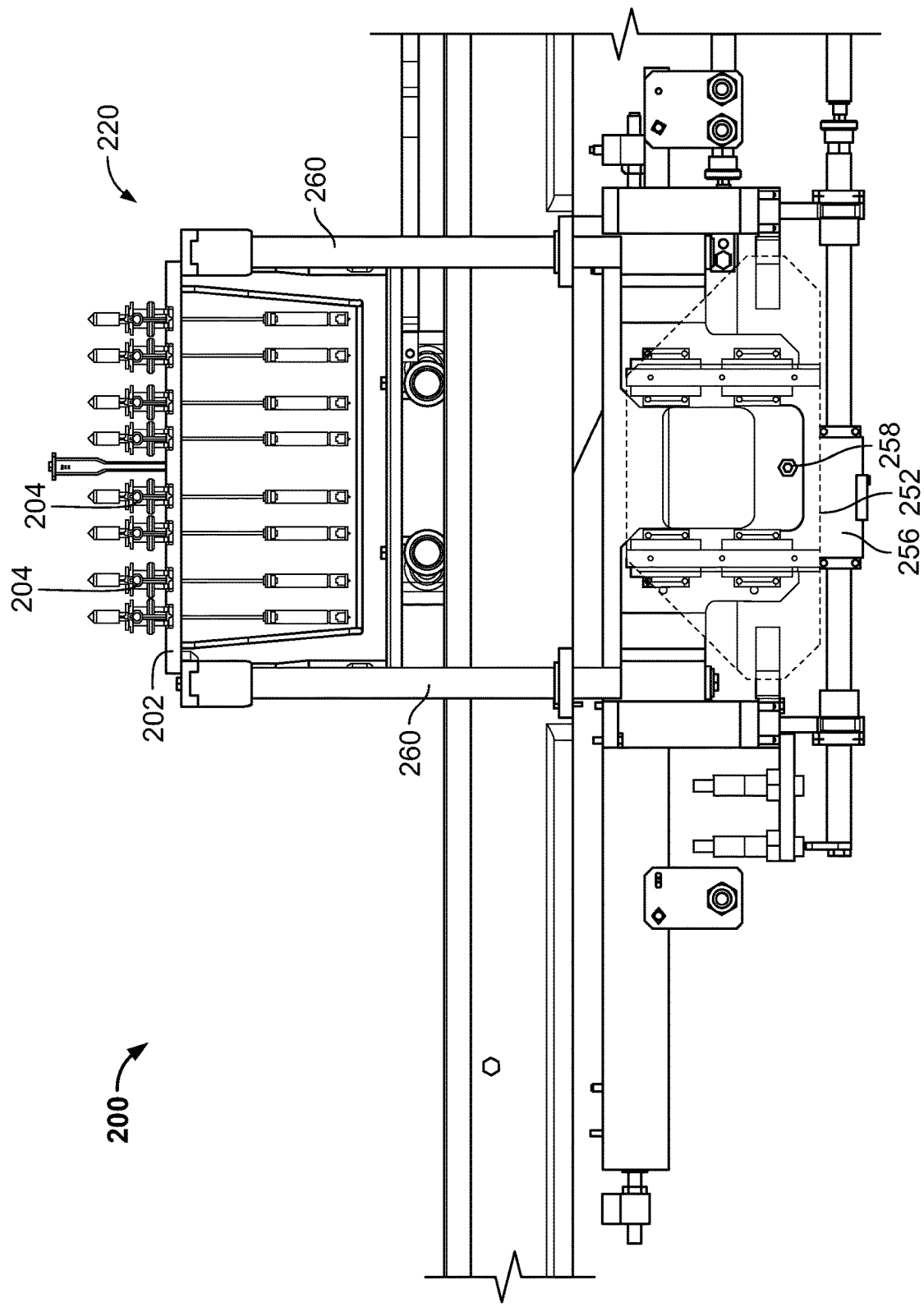
Figure 10:
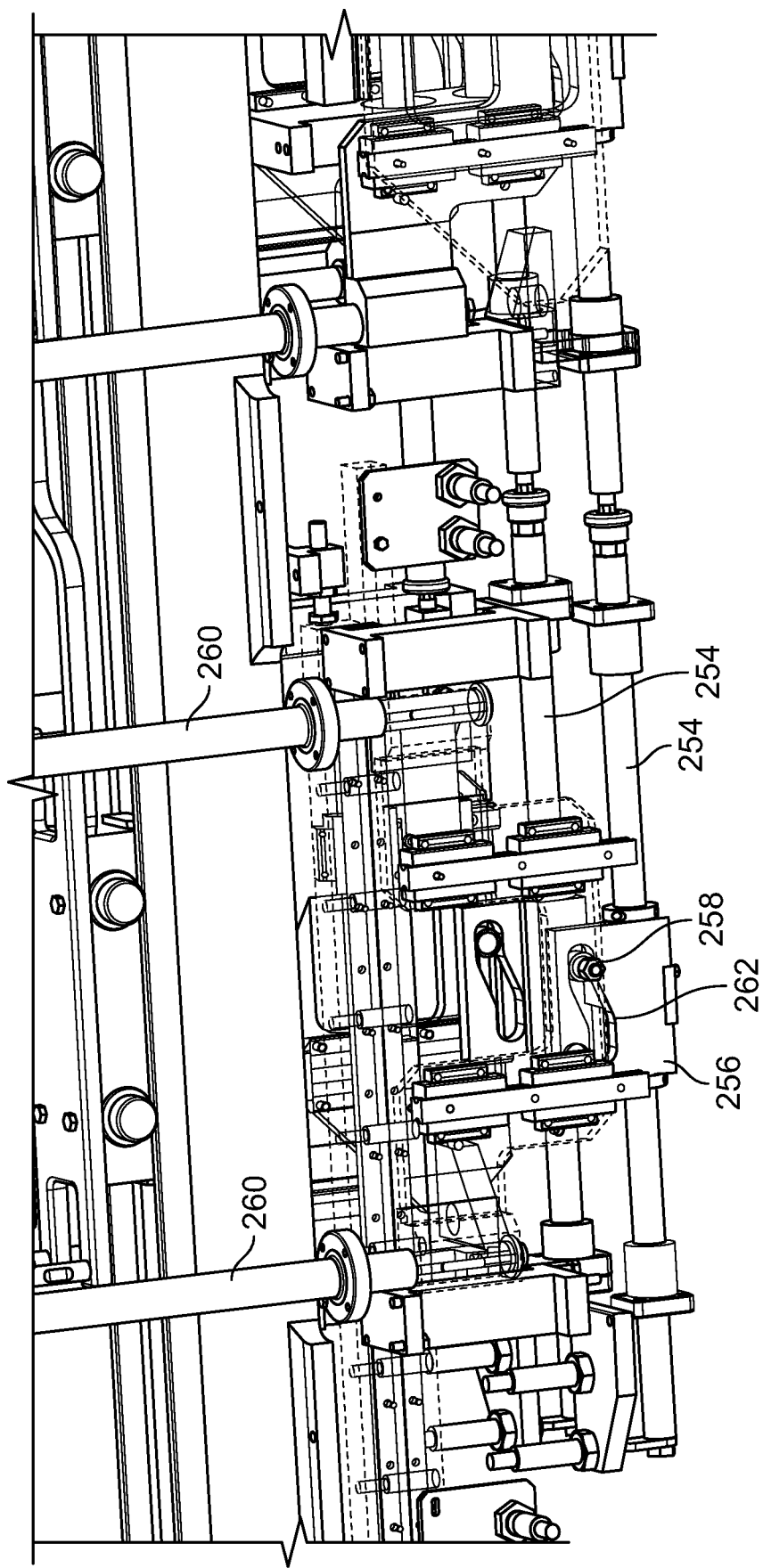
FIG. 10 is an isometric view of a portion of the conveyance system.

In reference to FIGS. 7-9, the lift mechanism 228 includes pneumatic actuators 252, shafts 254, cams 256, cam followers 258, and lift arms 260. In this embodiment, the pneumatic actuators 252 include horizontal air cylinders. The pneumatic actuators 252 are connected to the shafts 254 which are connected to the cams 256. As shown in FIG. 10, the cam followers 258 extend in slots 262 in the cams 256 and are connected to the lift arms 260. In alternative embodiments, the lift mechanism 228 may include any components that enable the lift mechanism 228 to function as described.

In operation, the pneumatic actuators 252 reciprocate the shafts 254 such that the cams 256 move horizontally. As the cams 256 move horizontally, the cam followers 258 move vertically in the curved slots 262 of the cams 256. The vertical movement of the cams 256 is translated to the lift arms 260. As a result, the lift arms 260 engage and move the racks 202 in the vertical direction. The lift mechanisms 228 of a single section are connected together to ensure the lift arms 260 move the racks 202 simultaneously.

Suitably, the lift arms 260 are located at stations. Accordingly, the racks 202 may be lifted and fluids dispensed while the column assemblies 204 are in the raised position. For example, the lift arms 260 adjacent a fill station may raise the racks 202 for the column assemblies 204 to be filled at the fill station. In addition, the lift arms 260 adjacent a wash station may raise the racks 202 for the column assemblies 204 to be washed at the wash station. In alternative embodiments, the lift arms 260 may be located at any positions that enable the conveyance system 200 to operate as described.

The walking beam mechanism 230 and the lift mechanism 228 are timed such that the linear movement of the carriages 220 and the vertical movement of the racks 202 are synchronized. For example, in some embodiments, the walking beam mechanism 230 causes the carriages 220 to move forward from a first position to a second position. While the carriages 220 are in the second position, the lift mechanism 228 raises the racks 202 off the carriages. Subsequently, the walking beam mechanism 230 causes the carriages 220 to move backward from the second position to the first position. The lift mechanism 228 then lowers the racks 202 onto new carriages 220 in the first position and the process is repeated. Accordingly, the racks 202 can be conveyed forward incrementally on a series of reciprocating carriages 220.

Figure 11:
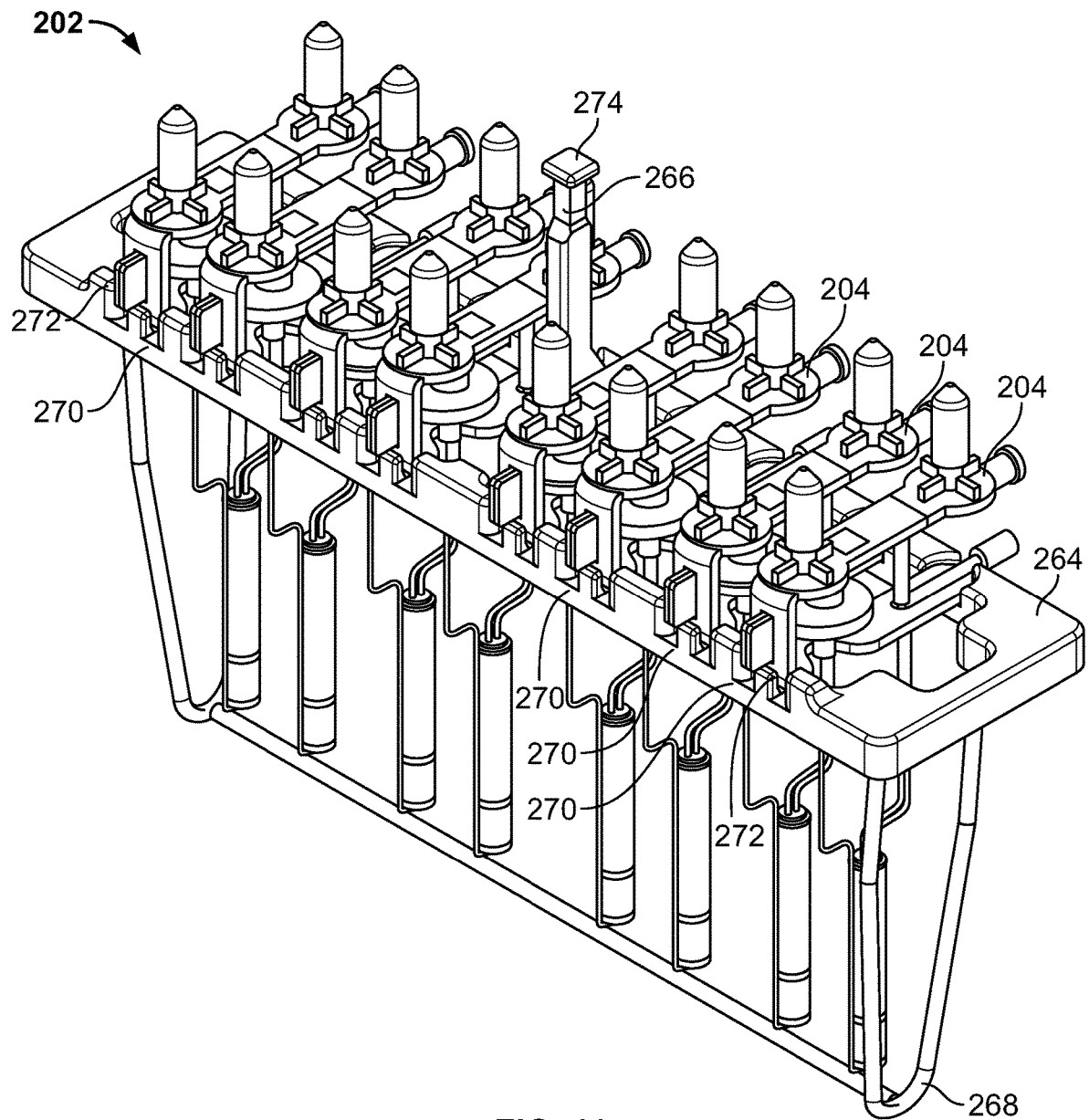
FIG. 11 is an isometric view of a rack conveyed by the conveyance system.

FIG. 11 is an isometric view of a rack 202 for use with the conveyance system 200. The rack 202 may hold column assemblies 204 during operation of system 100. The conveyance system 200 may include any number of the racks 202 that enable the system 100 to operate as described. In this embodiment, each carriage 220 holds one rack 202 and the conveyance system 200 includes 60 carriages and racks. Each rack 202 may hold any number of column assemblies 204. For example, in this embodiment, the rack 202 holds up to 8 column assemblies. Each rack 202 includes a column support 264, a handle 266, and a column guard 268. The column support 264 includes a plurality of slots 270 to support the column assemblies 204. The column guard 268 extends downward from the column support 264 to protect the lower portions of the column assemblies 204 from damage. In addition, the racks 202 may be sized and include lead-ins 272 to account for backlash of the magnetic coupling between the carriage 220 and the walking beam mechanism 230. The lead-ins 272 may be formed by sloped or beveled edges that facilitate or "funnel" inserting or directing column assemblies 204. The lead-ins 272 may extend adjacent to the slots 270 to facilitate insertion of the column assemblies 204. For example, in this embodiment, the rack 202 includes a lead-in 272 of about 2 millimeters (mm) adjacent each slot.

The column support 264 rests on the carriage posts 238 when the rack 202 is conveyed by the carriage 220. The lift mechanism 228 may engage the column support 264 to move the rack 202 in the vertical direction. The handle 266 extends upward from the column support 264 for manual movement of the column support. The handle 266 includes a top plate 274 that may be gripped by a telemanipulator (not shown) at a location above the column assemblies 204 to lift and/or reposition the rack 202. The racks 202 should weigh less than the maximum payload of the telemanipulators to allow the racks to be moved by the telemanipulators controlled by operators on the exterior of the hot cell. In this embodiment, the racks 202 weigh approximately three pounds.

In this embodiment, the racks 202 are made from a material such as stainless steel that is resistant to radiation. Moreover, the racks 202 are electro-polished for protection from repeated autoclave cycles. Portions of the rack 202, such as the column support 264 and column guard 268, may be welded together. Other portions of the rack 202, such as the column support 264 and handle 266, may be formed as a single piece. In alternative embodiments, the racks 202 are made in any manner that enables the racks to function as described.

Figure 12:
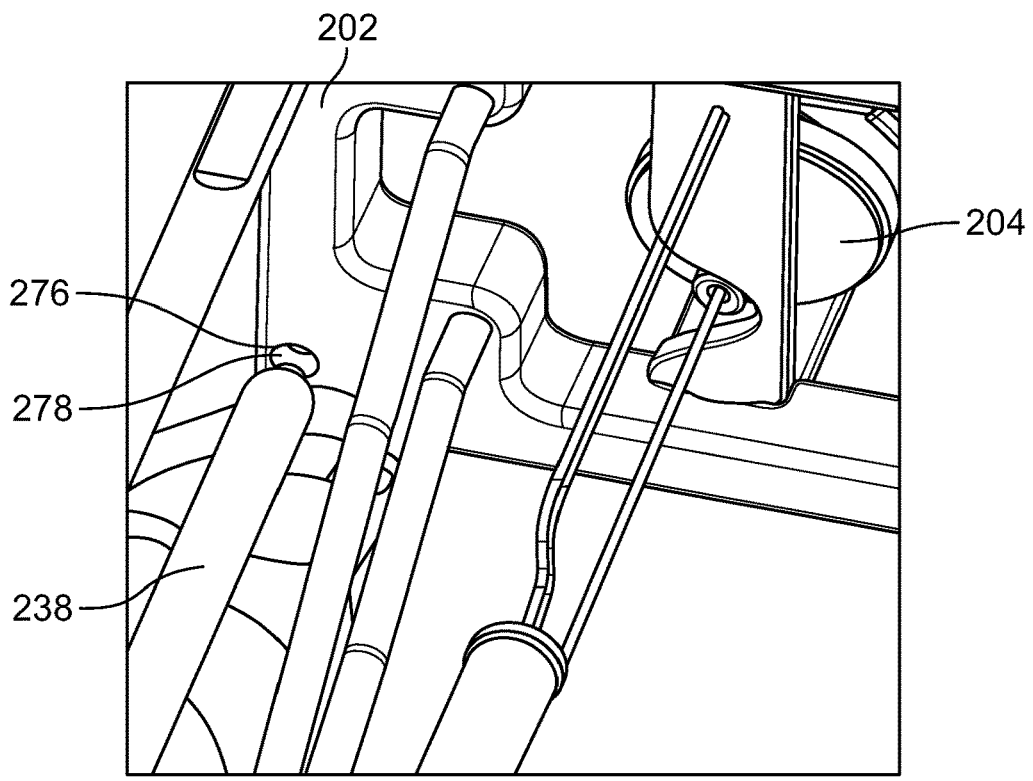
FIG. 12 is an isometric view of the underside of the rack.

In addition, in reference to FIG. 12, the racks 202 include datum features, broadly locating features, 276. The datum features 276 include holes in the bottom of the racks 202 that receive cones, broadly locating features, 278 extending from the carriage posts 238. In alternative embodiments, the conveyance system 200 may include any locating feature that enables the conveyance system 200 to operate as described.

In this embodiment, the racks 202 are conveyed sequentially through the following stations: a fill station, a wash station, an assay station, a tip cap station, and an autoclave load station. In some embodiments, a specified wait time must elapse between processing at each station. For example, in some embodiments, processing at the fill and wash stations must be separated by at least 30 minutes. In addition, processing at the wash and assay stations must be separated by at least 30 minutes. Accordingly, the conveyance system 200 includes buffer assemblies 300 (shown in FIG. 13) to satisfy the required wait times between the stations. In alternative embodiments, the conveyance system 200 may transfer the racks 202 between stations in any manner that enables system 100 to operate as described. For example, in some embodiments, the speed of the conveyance system 200 is adjusted between the stations. Also, the stations may be separated by a distance that allows the racks 202 to be conveyed in a desired time period. In further embodiments, at least some of the racks 202 are removed from the conveyance system 200 for a period of time necessary to provide the desired time between stations.

Figure 13:
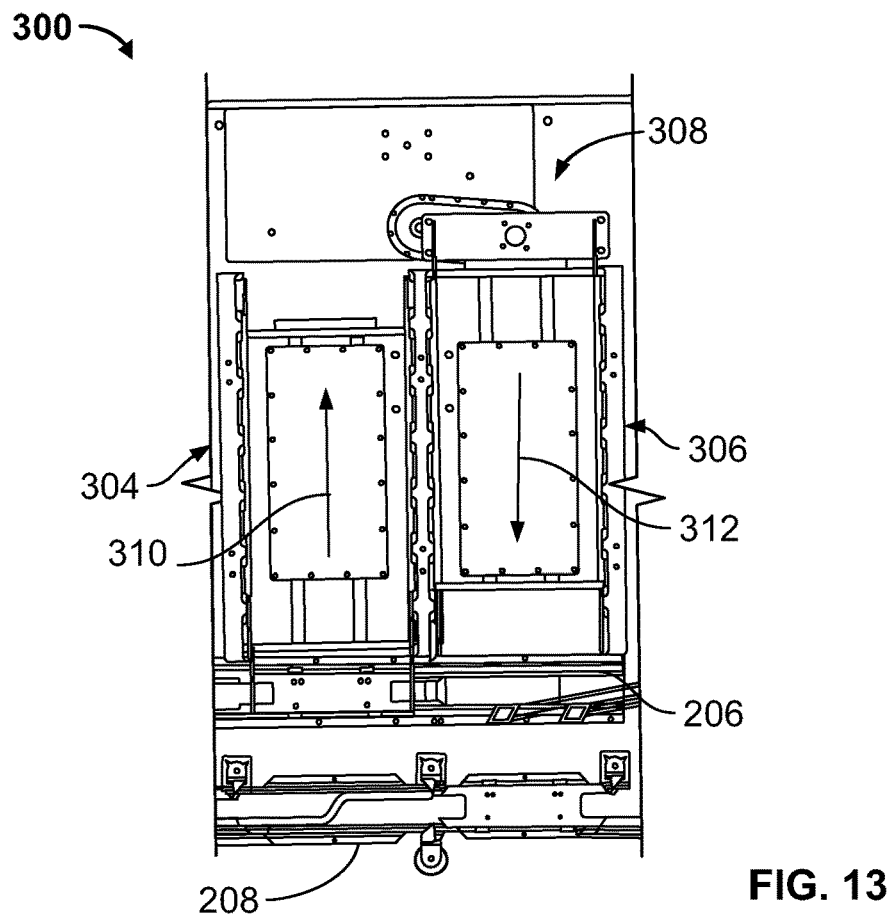
FIG. 13 is a plan view of a buffer section of the conveyance system.

In reference to FIG. 13, each buffer assembly 300 includes a walking beam mechanism 302, a first track 304, a second track 306, and a transfer assembly 308. The first track 304, the second track 306, and the transfer assembly 308 together form a loop. The racks 202 are conveyed along the first track 304 in a first direction 310. At the end of the first track 304, the racks 202 are transferred to the second track 306 and conveyed in a second direction 312 opposite the first direction 310. In alternative embodiments, the conveyance system 200 may include any buffer assemblies 300 that enable the conveyance system 200 to operate as described. For example, in some embodiments, the conveyance system 200 includes a buffer assembly 300 with a single continuous track and without a transfer assembly.

Figure 14:
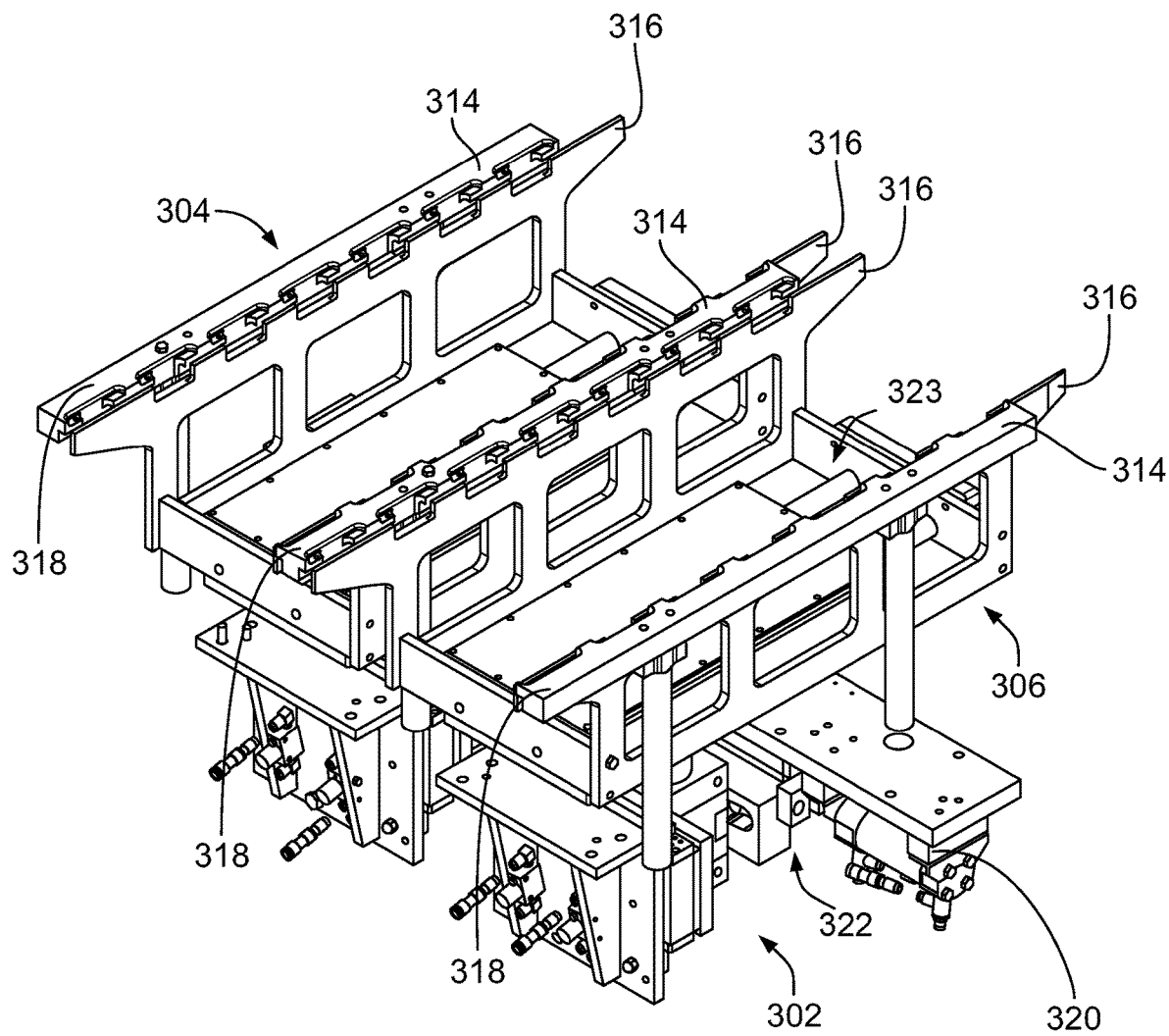
FIG. 14 is an isometric view of the buffer section

In reference to FIG. 14, each of the first and second tracks 304, 306 includes stationary rails 314 and lift rails 316. The racks 202 are supported on stationary rail nests 318 of the stationary rails 314. The lift rails 316 move in at least two dimensions to move the racks 202. The lift rails 316 are connected to pneumatic actuators 320 by a cam follower mechanism 322. The cam follower mechanism 322 provides for vertical movement of the lift rails 316. The lift rails are also connected to pneumatic actuator assemblies 323 which provide for horizontal movement of the lift rails 316.

During operation of the buffer assembly 300, the lift rails 316 first pneumatically raise all the racks 202 simultaneously. With the racks 202 lifted, the lift rails 316 pneumatically move laterally and move the racks 202. Specifically, the racks 202 on the first track 304 move toward the rear of the hot cell and the racks 202 on the second track 306 move in the opposite direction. The lift rails 316 then lower the racks 202 on to the stationary rail nests 318, and the lift rails 316 are indexed back to the original position. Accordingly, the racks 202 are conveyed along the first track 304 and the second track 306. When the racks 202 reach the end of the first track 304, a rotating transfer assembly 308 transfers the racks 202 from the end of the first track 304 to the start of the second track 306. In alternative embodiments, the racks may be conveyed along the first track 304 and the second track 306 in any manner that enables the buffer assembly 300 to operate as described herein. For example, in some embodiments, the rails 314 are moved vertically and/or horizontally by an actuator.

Figure 15:
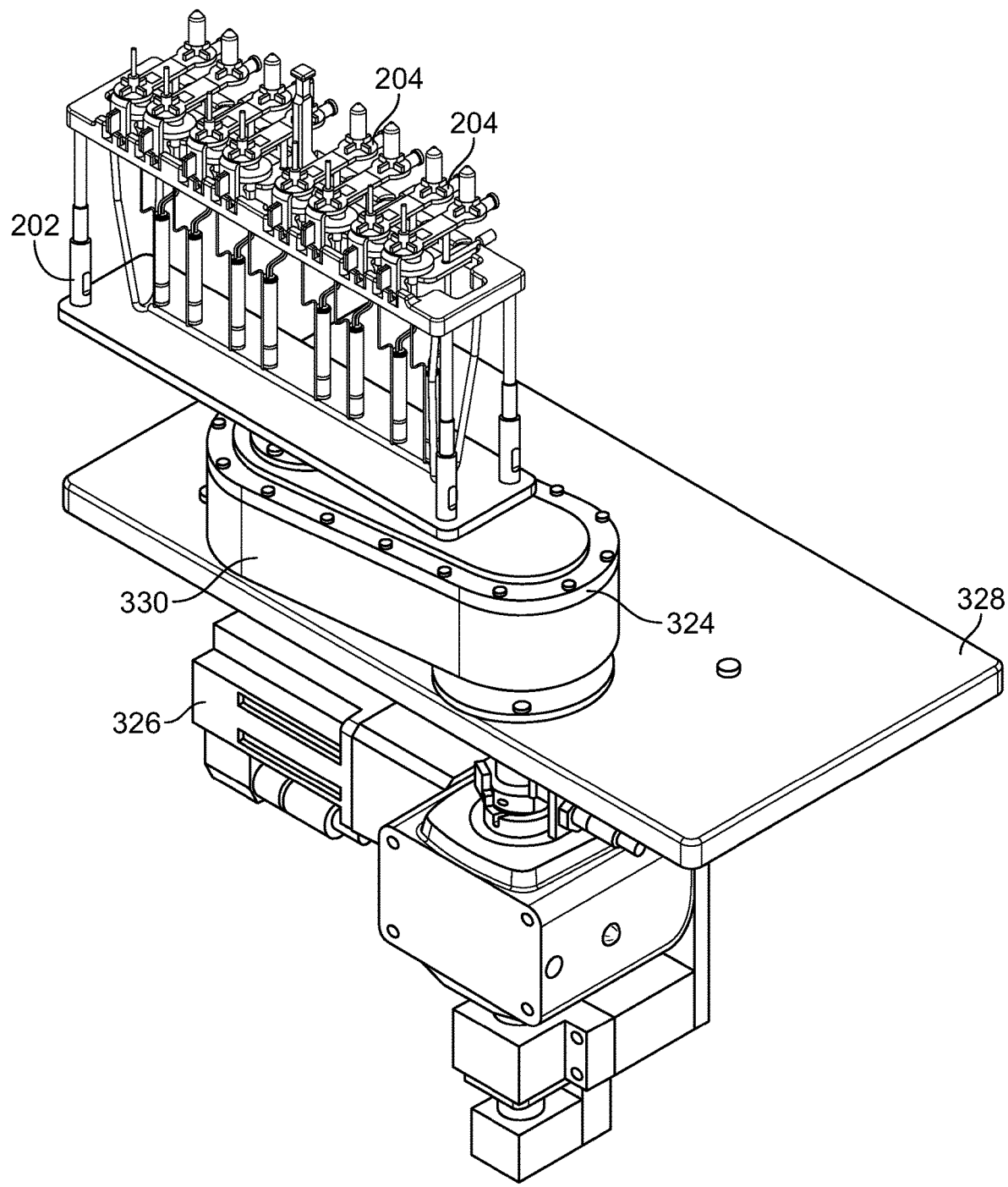
FIG. 15 is an isometric view of a transfer section of the conveyance system.

In reference to FIG. 15, the transfer assembly 308 includes a support 324, a servomotor 326, and a cover plate 328. The support 324 is rotatably connected to the servomotor 326 through the cover plate 328. During operation, the support 324 receives the rack 202 from the first track 304 and rotates the rack to a position where the rack is placed on the second track 306. The cover plate 328 separates the servomotor 326 and other electromechanical components from the upper portion of the cell to provide a sanitary workspace. In addition, a sealed gear train 330 maintains the orientation of the rack 202 during the transfer from the first track 304 to the second track 306.

Figure 16:
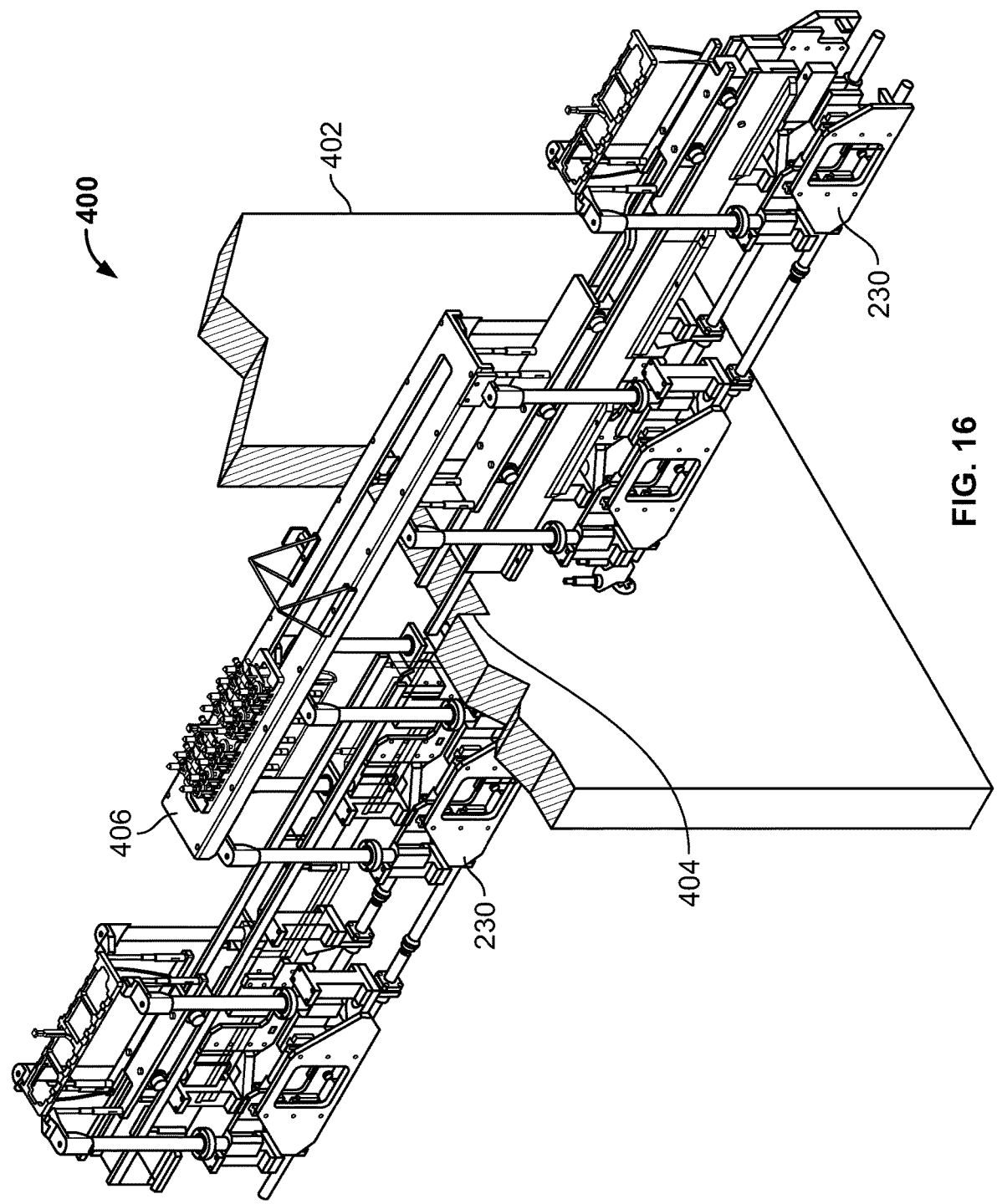
FIG. 16 is an isometric view of a transfer section of the conveyance system.

In reference to FIG. 16, the conveyance systems 200 may transfer the racks 202 between two adjoining cells 400. For example, racks 202 may transfer between a fill/wash cell and an assay cell. A wall 402 separating the cells may include a portal 404 for the racks 202 to be transferred through. The portal 404 includes a shielded door that can be closed during a sanitization process, or for maintenance purposes. Accordingly, the carriages 220 pass over a gap that allows the door to be closed without interference by the conveyance system. For example, in this embodiment, the carriages pass over a 170 mm (6.69 inch) gap between the fill/wash cell and the assay cell. During operation, walking beam mechanism 230 extends across the gap to move the carriages over the gap. In alternative embodiments, the racks may be transferred between cells in any manner that enables the conveyance system to operate as described.

As shown in FIG. 16, a transfer bridge 406 may be used to manually slide the racks 202 between the cells 400. For example, the transfer bridge 406 may be used to move the racks 202 between the cells 400 if the walking beam mechanism 230 fails to operate properly. The racks 202 may be manually guided along the transfer bridge 406 to move the racks 202 from a first carriage 220 positioned in a first cell 400 to a second carriage 220 positioned in a second cell 400. The transfer bridge 406 may be stored on the wall 402 of the cell 400 and moved into operating position when needed. The transfer bridge 406 may be moved by telemanipulators (not shown) controlled by operators on the exterior of the hot cell. Accordingly, the transfer bridge 406 should weigh less than the maximum payload of the telemanipulators. In this embodiment, the transfer bridge 406 weighs less than approximately 20 pounds. Also, the transfer bridge 406 may be made from any suitable materials such as plastics or metals, and combinations thereof. In this embodiment, the transfer bridge 406 is made from stainless steel and polyethylene.

FIG. 17 is an isometric view of a sensor 500 of the conveyance system 200. Sensors 500 are positioned along the conveyance system 200 to monitor the position of the racks 202 and detect misalignment. The sensors 500 are insensitive to radiation and are suitable for use in a radioactive environment. For example, the sensors 500 may have magnetically-actuated electrical contacts. In addition, the sensors 500 may include mechanical switches. In some embodiments, more than one sensor 500 may be used at a single location to provide redundancy.

In this embodiment, the sensor 500 includes a support 502, a housing 504, and a sensor mechanism 506. The sensor mechanism 506 is positioned on the housing 504 and connected to wiring within the housing 504. The interior of the housing 504 is sealed from the clean workspace. The housing 504 may extend below the tabletop 218 (shown in FIG. 4). In this embodiment, the sensor mechanism 506 includes a mechanical switch that opens or closes a circuit when the sensor mechanism 506 detects a rack 202.

The sensors 500 may be positioned anywhere along the conveyance system 200. For example, the sensors 500 may be positioned at the loading and unloading positions of the column assemblies 204. In addition, the sensors 500 may be positioned at intermediate stopping positions of the conveyance system. In this embodiment, at least one sensor 500 is positioned adjacent each pneumatic lift mechanism 228. The sensors 500 adjacent each pneumatic lift mechanism 228 may indicate an extended position and a retracted position of the lift mechanisms 228. For example, the sensors 500 adjacent pneumatic lift mechanisms may include a magnetic sensor mechanism such as a Hall effect sensor.

In addition, sensors 500 may track the position of carriages 220 and racks 202. For example, sensors 500 may be positioned below the tracks 206, 208 to track magnets of the carriages 220 and determine that the racks 202 are properly positioned. Separate sensors 500 may be included to sense different rack types. For example, some sensors 500 may be triggered by racks 202 holding column assemblies 204 and other sensors may be triggered by racks 600 (shown in FIG. 17) holding vials 602. The final two rack positions on the forward track 206 may be sensed to confirm that racks 202 have been moved manually to the autoclave.

FIG. 18 is an isometric view of a vial rack 600 for holding vials 602 for use with conveyance system 200. The vial rack 600 may be used in a gravity feed and an elution station. The vial rack 600 includes a support 604, a holder 606 defining a plurality of slots 608 for the vials 602, and handles 610 extending from the support. The support 604 may include lead-ins 612 such as sloped edges to facilitate insertion of the vials 602 in the slots 608. For example, the lead-ins 612 may extend at least 2 mm and be positioned adjacent the slots 608. The support 604 may rest on the carriage posts 238 and engage the lift mechanism 228. A portion of the support 604 may be pitched to ensure proper alignment of the vials 602. In addition, the support 604 may include openings to accommodate septums without contacting the septum surfaces. A portion of the vial rack 600 may include a trigger feature, such as a cutout, that triggers predetermined sensors. In addition, the vial rack 600 may include cutouts to allow visual inspection of fluid within the vials 602.

The vial rack 600 may be made from any materials suitable to withstand the radioactive environment. In this embodiment, the handle 610 is made from stainless steel and the support 604 is made from plastic. In some embodiments, the vial rack 600 may include a high contrast material, such as a colored plastic or stainless steel, to indicate a front surface of the vial rack. Suitably, the vial rack 600 weighs less than three lbs.

Embodiments of the systems and methods described provide several advantages over known systems. For example, embodiments of the conveyance systems are not sensitive to radiation levels and can automatically convey materials in a radioactive environment without operator intervention, and without risk of dropping fragile, highly radioactive product. The conveyance systems are driven by servomotors that provide highly accurate placement of materials. In addition, the conveyance systems convey materials in a controlled manner to minimize particulate levels during operation. Moreover, the conveyance systems minimize contamination because electronic and drive components of the conveyance systems are sealed from a workspace. Accordingly, the conveyance system allows the workspace to be sanitized with chemicals that may otherwise damage the electronic and drive components.

In addition, portions of the conveyance system in the workspace are accessible for cleaning and have surfaces (e.g., stainless steel) that facilitate cleaning. Also, the conveyance systems automatically and more precisely transfer racks between stations and reduce the need for, and risk of using, telemanipulators. The conveyance system creates a semi-automated loop, where product-filled racks feed in one direction, and empty racks feed in the opposite direction. In addition, the conveyance system includes redundant components to increase the reliability of the conveyance system.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A conveyance system for operation in an enclosed radioactive environment, the conveyance system comprising:
   a track;
   carriages positioned on and moveable along the track for conveying racks along the track;
   a walking beam mechanism magnetically coupled to the carriages to move the carriages along the track;
   a lift mechanism for lifting the racks off the carriages, the lift mechanism moveable between an extended position and a retracted position;
   a first sensor located to track the position of the carriages and racks along the track; and
   a second sensor located to detect whether the lift mechanism is in the extended position or the retracted position.

2. The conveyance system of claim 1, wherein the first sensor is located below the track and the second sensor is located adjacent the lift mechanism.

3. The conveyance system of claim 1, wherein the second sensor comprises a sensor mechanism including at least one of a mechanical switch and a magnetically-actuated electrical contact.

4. The conveyance system of claim 3, wherein the second sensor comprises a housing defining an interior that contains wiring connected to the sensor mechanism, the system including a seal to isolate the wiring.

5. The conveyance system of claim 1, wherein the second sensor includes mechanical switches, each mechanical switch corresponding to a different rack type to track the rack type to be lifted.

6. The conveyance system of claim 1, wherein the second sensor includes magnetically-actuated electrical contacts, each magnetically-actuated electrical contact corresponding to a different rack type to track the rack type to be lifted.

7. A system for manufacturing radionuclide generators, the system comprising:
   an enclosure defining a radioactive environment, the enclosure including radiation shielding to prevent radiation within the radioactive environment from exiting the enclosure; and
   a conveyance system within the enclosure, the conveyance system comprising:
   a forward track;
   first carriages positioned on and movable along the forward track for conveying racks in a first direction;
   a first walking beam mechanism magnetically coupled to the first carriages to move the first carriages;
   a return track, wherein the forward track and the return track form a loop; and
   second carriages positioned on and movable along the return track for conveying racks in a second direction opposite the first direction.

8. The system of claim 7 comprising a first station and a second station, wherein the forward track includes a first section and a second section, the first section extending through the first station and the second section extending through the second station.

9. The system of claim 8 comprising third carriages positioned on and movable along the second section and a second walking beam mechanism magnetically coupled to the third carriages to move the third carriages, wherein the racks are automatically transferred between the first carriages and the third carriages.

10. The system of claim 8, wherein the conveyance system comprises a buffer assembly to convey the racks for a predetermined time between the first section and the second section.

11. The system of claim 7, wherein the conveyance system comprises a second walking beam mechanism magnetically coupled to the second carriages to move the second carriages.

12. The system of claim 7, wherein the conveyance system comprises a servomotor connected to the first walking beam mechanism.

13. The system of claim 7, wherein the conveyance system comprises a lift mechanism for lifting the racks off the first carriages, the first walking beam mechanism adapted to move the first carriages in the second direction while the racks are lifted.

* * * * *